Sept. 3, 1929.　　　　J. B. LADD　　　　1,726,672
PIPE GRIPPING MECHANISM
Filed Jan. 14, 1928　　　2 Sheets-Sheet 1
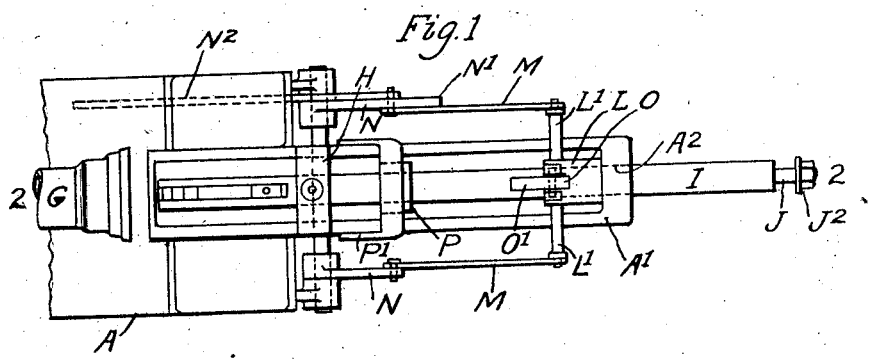
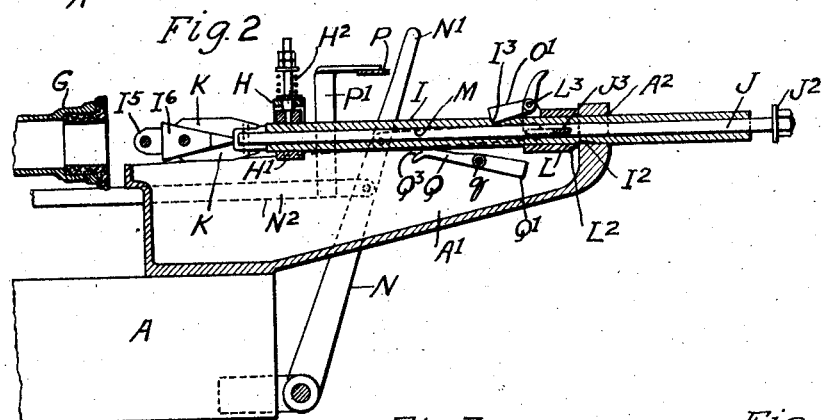
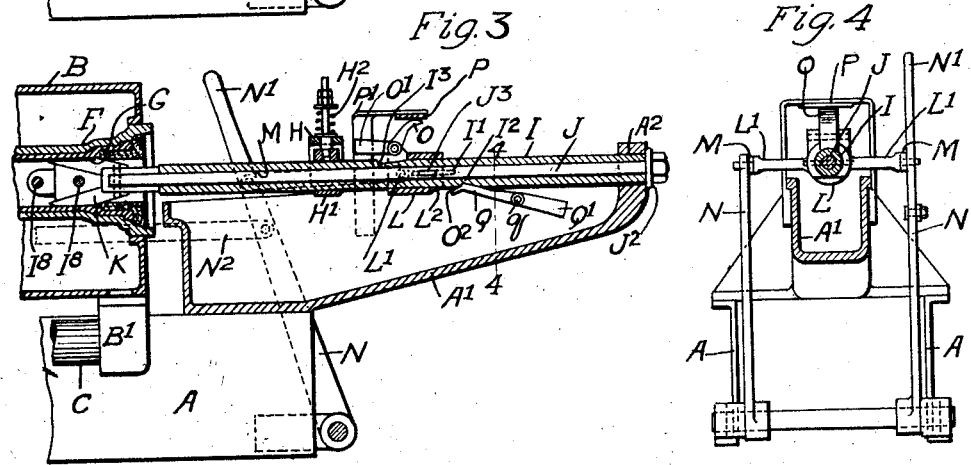
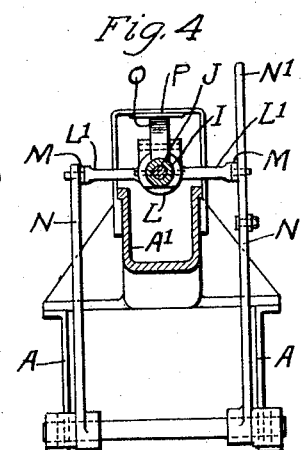
INVENTOR,
James B. Ladd
BY
Francis J Chambers
ATTORNEY

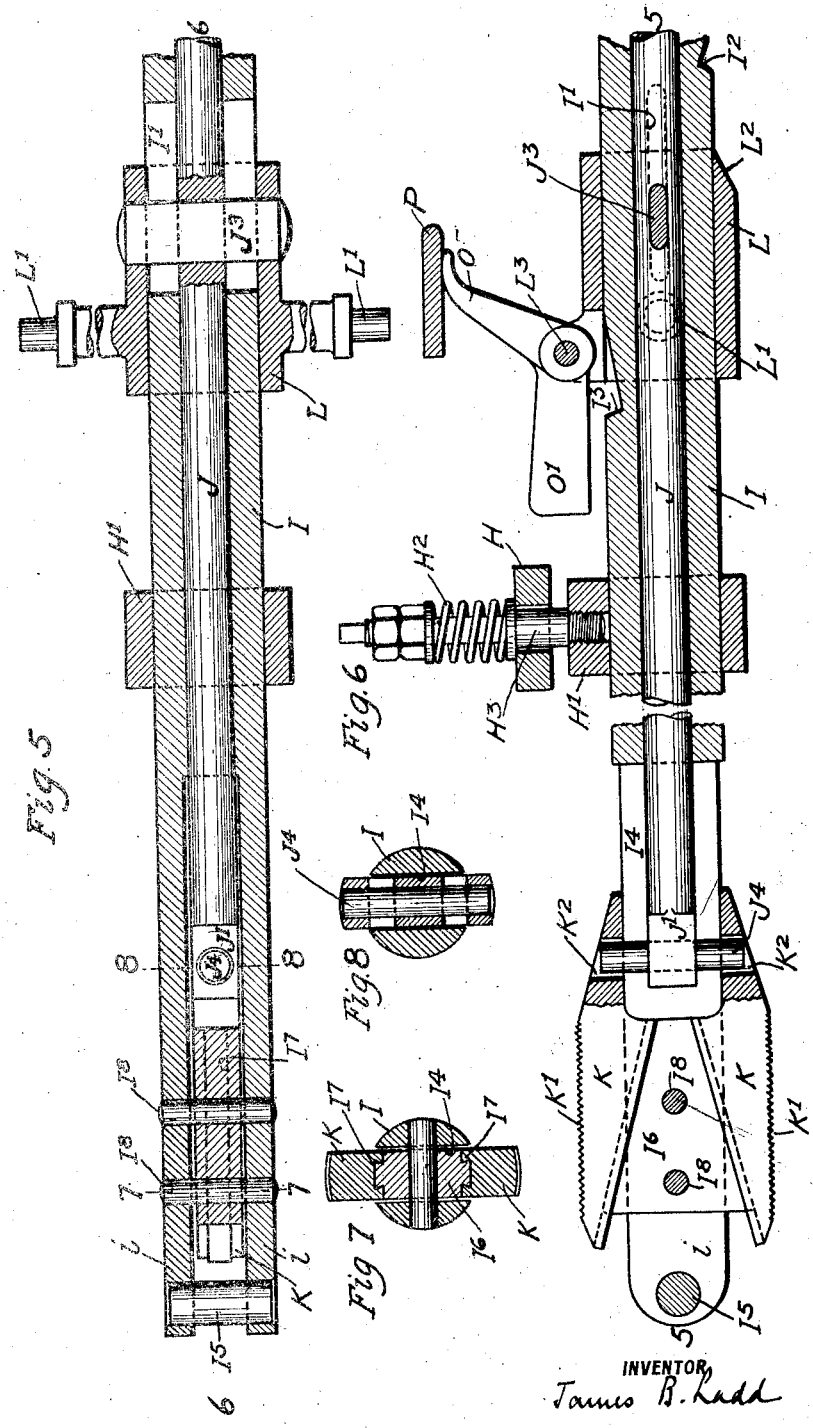

Patented Sept. 3, 1929.

1,726,672

UNITED STATES PATENT OFFICE.

JAMES B. LADD, OF ARDMORE, PENNSYLVANIA, ASSIGNOR TO UNITED STATES CAST IRON PIPE AND FOUNDRY COMPANY, OF BURLINGTON, NEW JERSEY, A CORPORATION OF NEW JERSEY.

PIPE-GRIPPING MECHANISM.

Application filed January 14, 1928. Serial No. 246,680.

My invention relates to mechanism especially designed to operate in withdrawing a centrifugally cast pipe from the mold in which it is cast and the object of my invention is to provide a pipe gripping device adapted to enter the end of a mold and engage the pipe therein and to hold the pipe when the mold is withdrawn, the mechanism being of such a character as to be conveniently operated. The nature of my improvements will be best understood as described in connection with the drawings in which Figure 1 is a plan view of my pipe gripping mechanism.

Figure 2, a sectional elevation on the line 2—2 of Fig. 1, with the gripping mechanism shown in retracted position.

Figure 3, a similar sectional elevation with the gripper shown in advance position and expanded to engage the pipe.

Figure 4 is a cross sectional elevation on the line 4—4 of Fig. 3.

Figure 5 is a sectional plan view showing the gripping mechanism on a larger scale, the section being taken as on the line 5—5 of Fig. 6.

Figure 6 is a sectional elevation of the gripping mechanism, taken as on the line 6—6 of Fig. 5.

Figure 7 is a cross sectional view on the line 7—7 of Fig. 5, and

Figure 8 is a cross sectional view on the line 8—8 of Fig. 5.

My gripping mechanism is especially adapted for use in connection with pipe casting machines of the well known de Lavaud type, in which the mold is supported on a reciprocating carriage. A indicates the framing of the machine, on the end of which is supported the supplemental frame $A^1$ which supports the gripping mechanism; $A^2$ indicating a perforation in this frame through which the gripper supporting members pass and which affords an abutment limiting motion in both directions. B indicates the water jacket of the pipe casting machine which also forms a carriage, reciprocating on the frame A; $B^1$ indicating a downwardly extending lug from the carriage which is engaged by a piston rod C, connected with a hydraulic cylinder and piston, not shown. F indicates the mold which is rotatably supported in the water jacket and G indicates the pipe centrifugally cast in the mold. H indicates a bar supported on the frame $A^1$ and supporting through a spring $H^2$ a sleeve $H^1$. I indicates a gripper supporting member, preferably formed, as shown, as a tube. This tube is slotted as indicated at $I^1$ and provided with locking notches on its lower and upper faces, as indicated at $I^2$ and $I^3$. The tube body is also slotted, as indicated at $I^4$, this slot extending to the outer end of the tube, forming a port at the end of the tube, the ends of which port, as shown, are held together by a bar $I^5$. $I^6$ is a wedge having guideways $I^7$ secured in the slotted end of the tube I by pins $I^8$. J is a second gripper supporting member, preferably formed, as shown, on a rod slidingly mounted in the tube I. The other end $J^1$ of this rod extends into the slot $I^4$ of the tube I and has extending from it a pin $J^4$, the ends of which project into the pin holes $K^2$ of the sliding jaws K, K, having serrated gripping edges $K^1$ and moving in the guideways $I^7$ of the other gripper member, to wit, the wedge $I^6$. A pin $J^3$ projects from the gripper member J through both sides of the slot $I^1$ in the tube I and engages a sleeve like member, indicated at L, provided with trunnions $L^1$ and having its rear lower edge chamfered, as indicated at $L^2$. M, M, are links connecting with the trunnions $L^1$ and pivotally connected to a lever N, the handle of which is indicated at $N^1$; $N^2$ indicating a link which may be used to connect the lever N with a similar lever, not shown, located at a distance thus enabling the lever W to be actuated from a distant point. The sleeve L also carries a pivot pin $L^3$ which in turn carries a locking pawl $O^1$ having a projecting finger O which as the gripper supporting members move forward, is engaged by a bar P, secured to the frame of the machine and extending over the tube I, as shown. Q is a locking pawl pivotally mounted on the frame $A^1$ at $q$ and having a counter-weight $Q^1$ which tends to press the locking pawl upward. The locking pawl is provided with a lip $Q^2$.

In operation, the gripper supporting member I is slidingly supported in the bearing $A^2$ and the sleeve bearing $H^1$ in retracted position. The parts occupy the relative positions indicated in Fig. 2, the locking pawl $O^1$ engaging in the locking detent $I^3$ and the gripper members K, K, occupying retracted positions with regard to the wedge $I^6$, on which they are supported. A pipe having been cast in the mold F and the mold brought to the position shown in Fig. 3, the operator takes hold of the lever handle N¹ and moves it toward the mold and through the links M; he moves the sleeve L toward the mold, carrying with it the rod J. This movement of the sleeve L also carries with it the tube I by reason of the engagement of the pawl O¹ and the net result is to carry the gripping device into the mouth of the pipe, as indicated in Fig. 3. After the gripper has entered the pipe, the finger O comes in contact with the bar P, lifting the pawl O¹ out of the notch I³ so that the rod J can move forward independently of the sleeve I, as a result of which movement the grippers are expanded, as shown in Figs. 3 and 6, and firmly engaged with the inside of the pipe. After this engagement is effected, the mold is moved away by mechanism not shown, the pipe remaining stationary and being thereby freed from the mold. The next step is to release the grippers from the pipe and this is accomplished by moving the lever N toward the right. In pipe engaging position the tubular member I is engaged by the pawl Q, which enters the notch I² on the under side of the tube and the backward movement of the lever which, of course, moves the sleeve L backward, moves the rod J also backward by reason of its engaging the sleeve through its pin J³. The first result of the movement is, therefore, to contract the gripper and release the pipe. Following this release, the chamfered edge L² of the sleeve L contacts with the lip Q² of the pawl Q and releases it from engagement in the notch I² so that a further backward movement of the rod J will carry with it the tube I and the parts will assume their normal position of rest, as indicated in Fig. 2.

Having now described my invention, what I claim as new and desire to secure by Letters Patent, is:

1. Pipe gripping mechanism consisting of an expansible pipe gripper, a longitudinally movable support for projecting and retracting the gripper into and out of the pipe, means brought into action by the forward movement of the support for expanding the gripper at the end of its movement into the pipe and means brought into action by the backward movement of the support for contracting said gripper at the beginning of the backward movement of the support.

2. Pipe gripper mechanism comprising in combination expandible gripper members, means for advancing and retracting and expanding and contracting the gripper, consisting of two longitudinally movable gripper supports relatively movable to expand and contract the grippers and movable together to advance and retract them, means for locking the gripper supports together in gripper contracted position, means for releasing said lock as the gripper supports move forward to pipe engaging position so as to permit of their relative movement to expand the grippers, a locking device located to engage one of the supports when in advanced position and means for actuating the supports attached to the other support and connected to retract both supports after the one to which it is attached has been retracted to contract the grippers.

3. Pipe gripper mechanism comprising in combination expandible gripper members, means for advancing and retracting and expanding and contracting the grippers, consisting of two longitudinally movable gripper supports relatively movable to expand and contract the grippers and movable together to advance and retract them, means for locking the gripper supports together in gripper contracted position, means for releasing said lock as the gripper supports move forward to pipe engaging position so as to permit of their relative movement to expand the grippers, a locking device located to engage one of the supports when in advanced position, means for actuating the supports attached to the other support and connected to retract both supports after the one to which it is attached has been retracted to contract the grippers and a lock releasing device attached to said reciprocating device.

JAMES B. LADD.